United States Patent [19]

Haynes et al.

[11] Patent Number: 5,327,734
[45] Date of Patent: Jul. 12, 1994

[54] PASSIVE-ACTIVE THERMOSYPHON

[75] Inventors: Francis D. Haynes, Etna, N.H.; John P. Zarling, Fairbanks, Ak.; William F. Quinn, Hanover, N.H.

[73] Assignee: The United States of America as represented by the Secretary of the Army, Washington, D.C.

[21] Appl. No.: 883,443

[22] Filed: May 15, 1992

[51] Int. Cl.$^5$ .............................................. F25D 23/12
[52] U.S. Cl. ................ 62/260; 62/DIG. 22; 165/45; 165/104.21
[58] Field of Search ......... 62/119, 260, 333, DIG. 22; 165/45, 104.211

[56] References Cited

U.S. PATENT DOCUMENTS

| 3,976,125 | 8/1976 | Best | 165/45 |
| 4,524,822 | 6/1985 | Hage et al. | 165/104.21 |

Primary Examiner—John M. Sollecito
Attorney, Agent, or Firm—Luther A. Marsh

[57] ABSTRACT

A thermosyphon for use in frozen or unfrozen soil includes an evaporator section embedded in the soil, a condenser section exposed to ambient air, an intermediate section connecting the two sections and a heat exchanger connected to a mechanical refrigeration source and operable to cool either the condenser or the intermediate section of the thermosyphon during periods when the ambient temperature is higher than that at which passive thermosyphonic cooling occurs.

5 Claims, 7 Drawing Sheets

PASSIVE-ACTIVE THERMOSYPHON

The present invention pertains to thermosyphons and, more particularly, to thermosyphons capable of operating either in a self-contained passive mode or in a mechanical refrigeration assisted active mode.

BACKGROUND OF THE INVENTION

When structures are built in regions of permafrost, heat flow from the structure into the permafrost may cause thawing of the permafrost, degrading the stability thereof and resulting in structural damage. One approach to this problem is the use of passive thermosyphons to extract heat from the permafrost and maintain the same at a sufficiently low temperature to prevent thawing. A typical passive thermosyphon has an evaporator section buried in the permafrost, a condenser section exposed to the ambient and an intermediate section providing fluid communication between the evaporator and condenser sections. The thermosyphon is a closed system containing a working fluid such as $CO_2$ or $NH_3$. Such devices are substantially maintenance free and do not involve any operating costs.

A disadvantage of a passive thermosyphon is that it only operates when the ambient air temperature is below that of the soil. In permafrost regions this is typically from September to May. Consequently structural foundations may be vulnerable to unusually warm summers. Also, passive thermosyphons installed during summer months remain inoperative until fall, which may adversely impact construction schedules. Mechanical refrigeration systems with evaporator lines buried in the permafrost have been used to overcome these disadvantages of thermosyphons. While such mechanical systems do provide year around operation, they involve substantial operating costs and have the potential for an in-ground fluid spill if a buried circulation line fails.

It is a primary object of the present invention to provide a thermosyphon capable of operating in a self-contained passive mode when ambient temperature conditions are suitable or in an active mode with mechanical refrigeration assistance.

It is also an object of the present invention to provide a passive-active thermosyphon which allows for the use of mechanical refrigeration without the need for buried mechanical refrigeration circulation lines.

Other objects of the present invention include providing ground freezing for construction purposes and providing immobilization of toxic liquids. These objects may be accomplished in geographical areas having unfrozen or seasonally frozen ground.

SUMMARY OF THE INVENTION

The above and other objects of the invention which will become apparent hereinafter are achieved by the provision of a passive-active thermosyphon which includes an evaporator section adapted to be located within permafrost or unfrozen soil, a condenser section adapted to be exposed to ambient air, an intermediate section connecting the evaporator and condenser sections to form a closed thermosyphon system charged with a working fluid, and a heat exchanger, located in the intermediate section of the thermosyphon, connected to a source of mechanical refrigeration. When the ambient air temperature is below that of the permafrost soil, the thermosyphon operates in a passive mode, the heat exchanger being inactive. At other times, chilled refrigerant is supplied to the heat exchanger to cool and condense the thermosyphon working fluid.

For a complete understanding of the invention and the objects and advantages thereof, reference should be had to the accompanying drawings and the following detailed description wherein preferred embodiment of the invention are illustrated and described.

DESCRIPTION OF THE PREFERRED EMBODIMENTS

Figure 1:
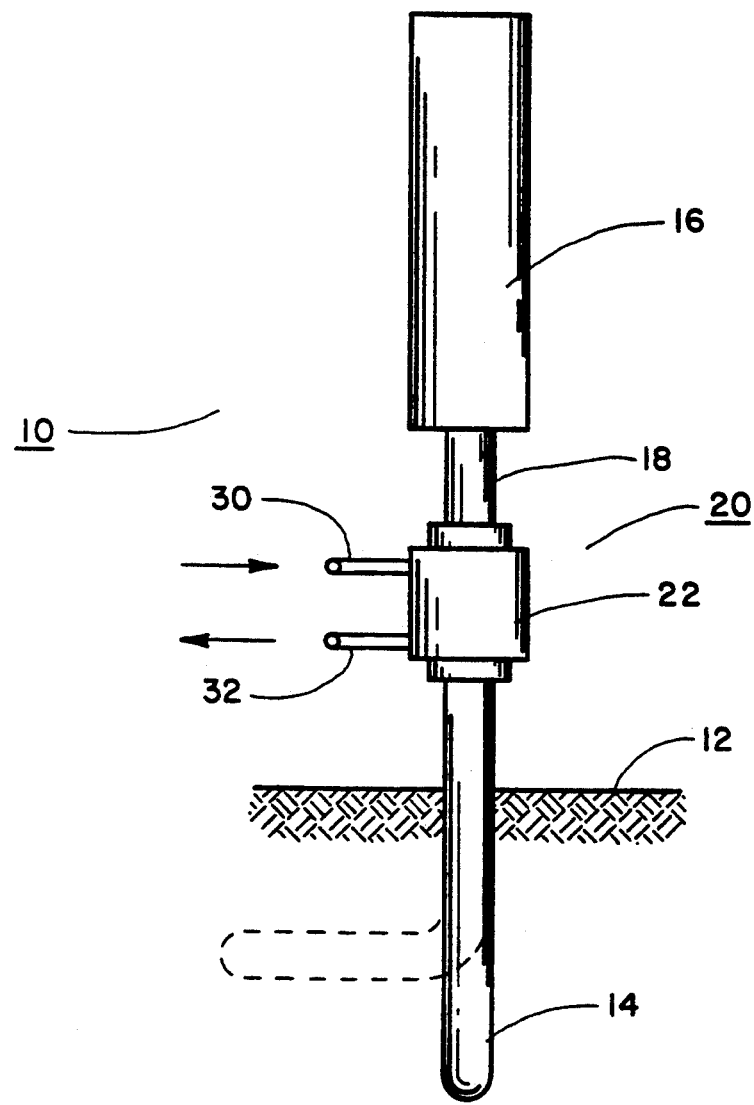
FIG. 1 is a schematic elevational view of a first embodiment of the passive-active thermosyphon of the present invention.

Having reference to FIG. 1, a thermosyphon, designated generally by the reference numeral 10, of the type used to maintain a region of permafrost soil 12 in a frozen state includes an evaporator section 14 buried in the soil, a condenser section 16 above the evaporator section and exposed to the ambient air, and an intermediate section 18 connecting the evaporator and condenser sections. As is shown, the evaporator section may extend vertically into the permafrost or non-permafrost region or, as shown in broken line, may be horizontally oriented. The evaporator, condenser and intermediate sections are hollow and in direct communication with one another, together providing a closed system. This system is filed with a thermosyphon working fluid, e.g. $CO_2$ or $NH_3$. As long as the ambient air temperature is below that of the soil, the thermosyphon 10 operates in a self-contained or passive mode, the working fluid evaporating in the evaporator section 14, thereby extracting heat from the soil with the resultant gas flow upwardly through the intermediate section 18 to the condenser section 16 where heat is released to the ambient air, causing the working fluid to condense to the liquid state and flow downwardly by gravity to the evaporator section.

Figure 2:
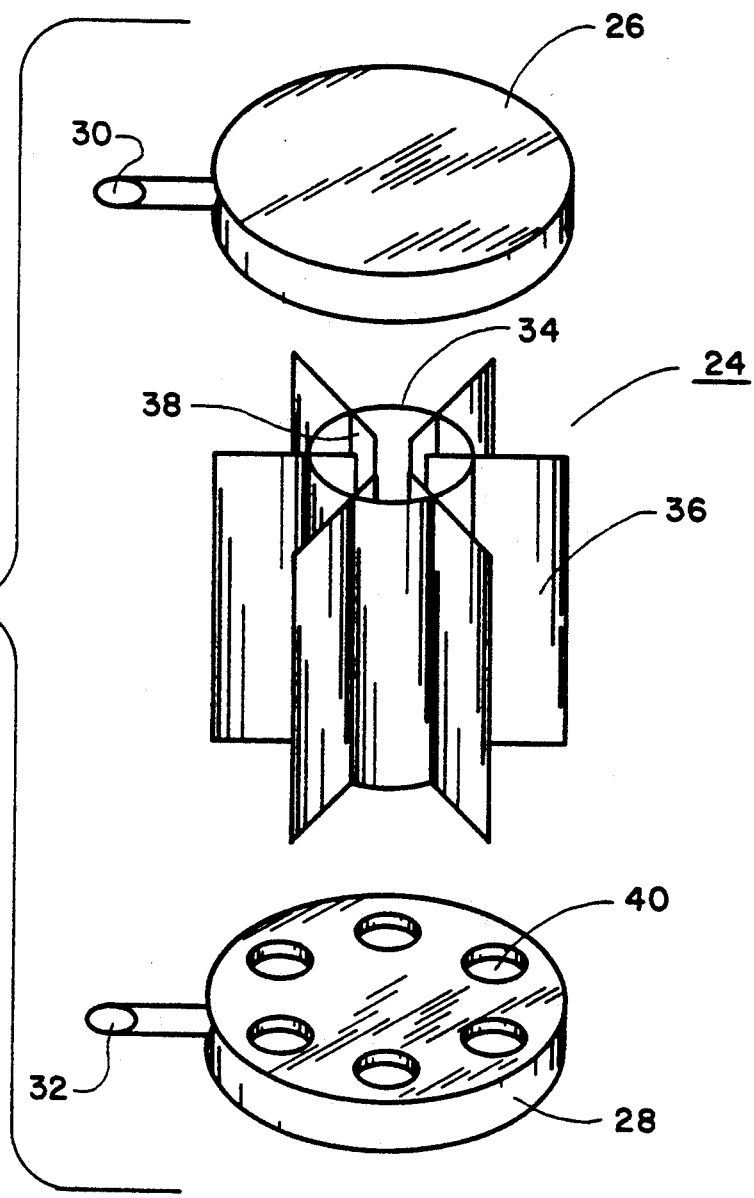
FIG. 2 is an exploded isometric view of a portion of the apparatus of FIG. 1.

A passive thermosyphon, as described in the preceding paragraph, is inoperative when the ambient air temperature is greater than that of the soil. In order to provide cooling for the soil during such conditions, the present invention provides a heat exchange module, designed generally by the reference numeral 20, for connecting the thermosyphon 10 to a mechanical refrigeration source (not shown). In the embodiment of the invention shown in FIGS. 1 and 2, the module 20 is located in the intermediate section 18 of the thermosyphon. The module includes an insulated, fluid-tight housing 22, a finned heat exchanger 24 within the housing, and upper and lower manifolds 26, 28 which are connected to refrigeration lines 30,32, respectively, extending to the mechanical refrigeration source. The heat exchanger 24 has an open-ended metal tube 34 forming a continuation of the thermosyphon intermediate section 18 through the module, external fins 36 extending radially outwardly from the tube to the inner wall of the housing 22, and internal fins 38 extending radially inwardly from the tube. The manifold 28 is provided with openings 40 communication with refrigerant line 32 and with the spaces between the tube 34, the external fins 36 and the housing inner wall. While not shown in detail, manifold 26 is of the same configuration.

When active mode operation of the thermosyphon 10 is desired, the mechanical refrigeration system is activated to circulate chilled refrigerant through the spaces between the housing 22 and the tube 34 thus cooling the tube 34 and fins 38 so that the vapor of the thermosyphon working fluid condenses on these surfaces. In the active mode of operation of this embodiment of the thermosyphon, the condenser section 16 is inactive, the working fluid circulating between the evaporator section 14 where heat is extracted from the permafrost soil and the module 20 where heat is transferred to the mechanical refrigeration system.

Figure 3:
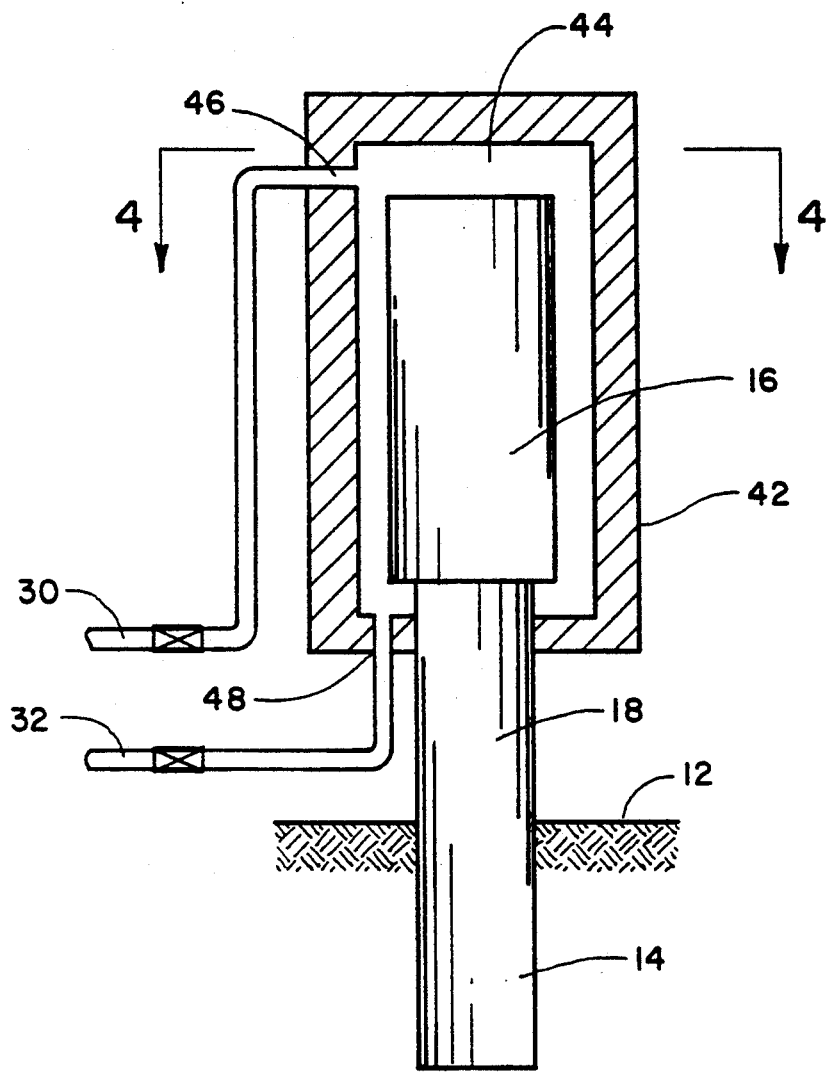
FIG. 3 is a schematic elevational view, partially in section, of a second embodiment of the passive-active thermosyphon of the present invention.
Figure 4:
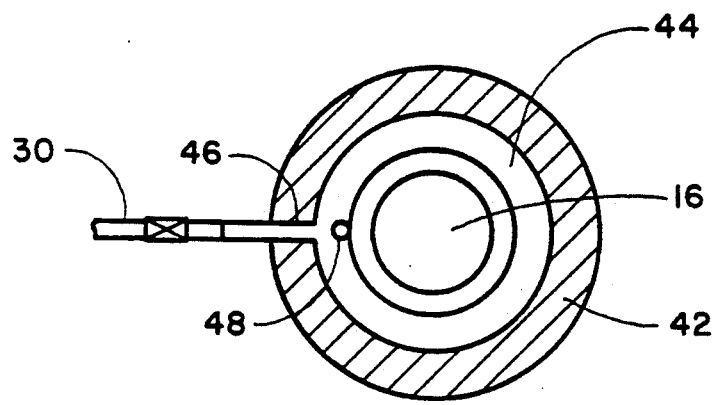
FIG. 4 is a transverse cross sectional view taken on the line 4—4 of FIG. 3.

In the embodiment of the invention illustrated in FIGS. 3 and 4, a fluid-tight, insulated housing 42 encases the entire condenser section 16 of a conventional thermosyphon, the housing being of sufficient size as to provide circulation space 44 around the condenser section and includes an upper port 46 to which the first mechanical refrigerant line 30 is connected and a lower port 48 to which the second line 32 is connected. Active mode operation of the thermosyphon of this embodiment involves the circulation of chilled refrigerant from the mechanical source through the space 44 to cool the condenser section 16, condensing the working fluid vapors therein. During periods when passive operation of the thermosyphon is feasible, the housing 42 is removed from the condenser section 16.

Figure 6:
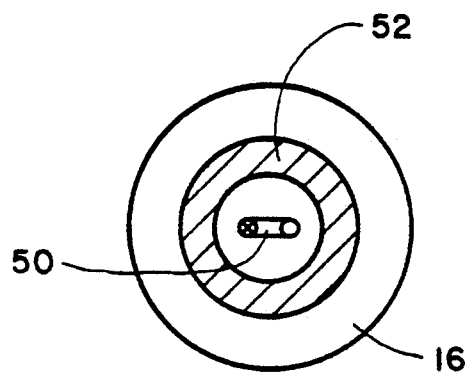
FIG. 6 is a transverse cross sectional view taken on the line 6—6 of FIG. 5.
Figure 5:
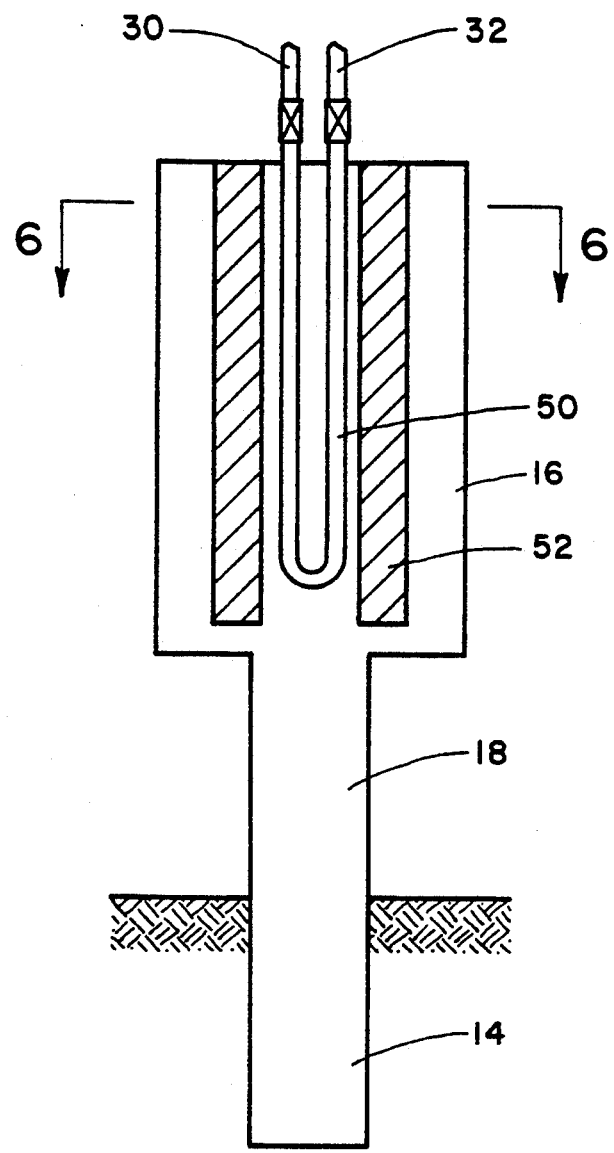
FIG. 5 is a schematic elevational view, partially in section, of a third embodiment of the passive-active thermosyphon of the present invention.

FIGS. 5 and 6 show a further modification of the thermosyphon of the invention. In this embodiment, the condenser section 16' is enlarged and provided with an internal heat exchanger 50 connected to the mechanical refrigerant lines 30 and 32. The internal heat exchanger 50 may consist of a loop, as shown, or may consist of coils, non-circular or a small thermosyphon and may be surrounded by an open bottom, insulating baffle 52.

Figure 7:
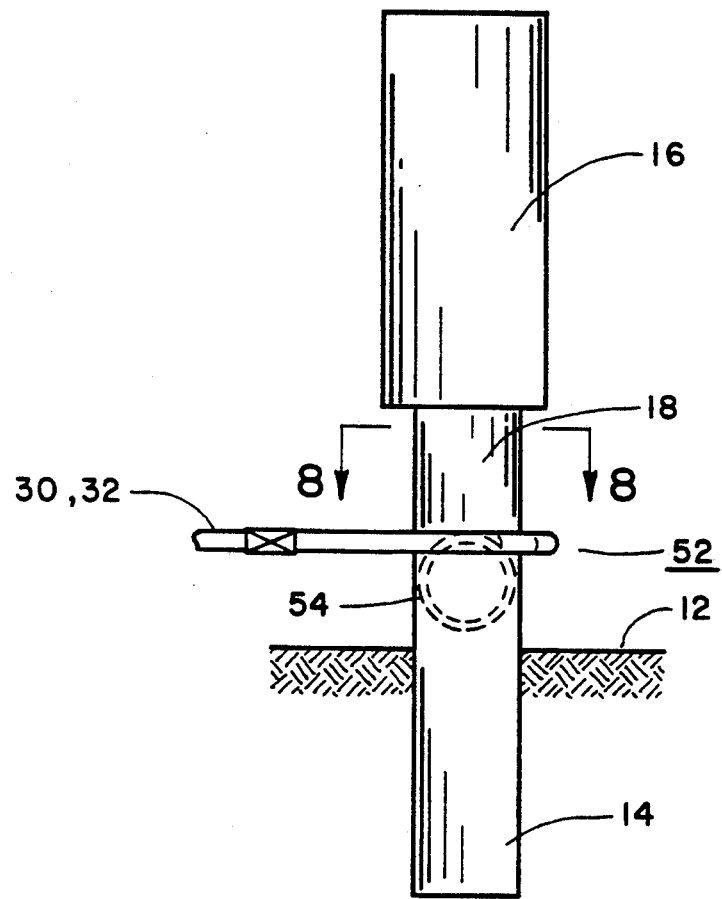
FIG. 7 is a schematic elevational view of a further modification of the passive-active thermosyphon of the present invention.
Figure 8:
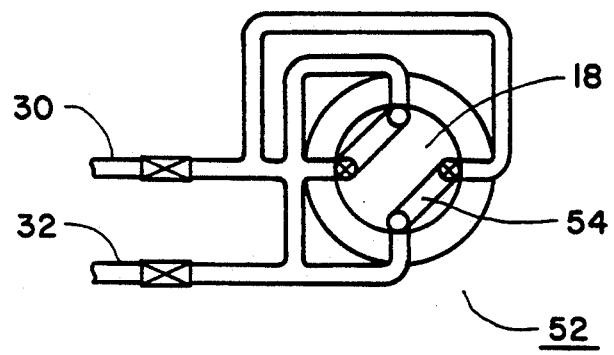
FIG. 8 is a transverse cross section view taken on the line 8—8 of FIG. 7.
Figure 9:
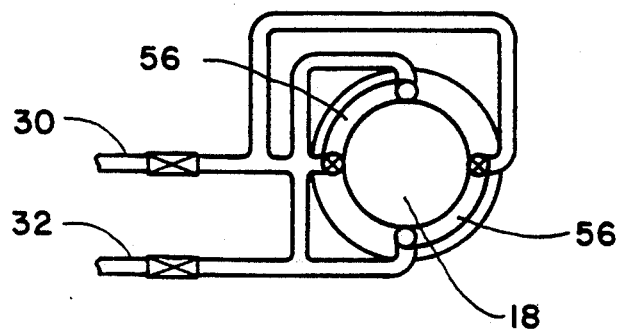
FIG. 9 is a transverse cross sectional view similar to that of FIG. 8 but showing a further modification of the invention.

Having reference to FIGS. 7, 8 and 9, further embodiments of the thermosyphon of the invention are illustrated. As is shown in FIGS. 7 and 8, the mechanical refrigerant lines 30 and 32 may be connected to a heat exchange unit 52 which consists of pipe loops 54 located within the intermediate section 18 of the thermosyphon. Alternatively, as shown in FIG. 9, the heat exchange pipe loops 56 may be mounted on the exterior surface of the intermediate section 18.

In the embodiments described above, reference is made to mechanical refrigeration systems. It is also within the contemplation of the invention to employ a fan radiator to supply cooled fluid to the heat exchange unit.

While the preferred embodiments of the invention have been illustrated and described in detail herein, it will be apparent that changes and additions may be had therein and thereto without departing from the spirit of the invention. Reference should, accordingly, be had to the appended claims in determining the true scope of the invention.

What is claimed is:

1. Apparatus for providing refrigeration for the ground, for seasonal frost or permafrost areas, comprising:
   an evaporator section adapted to be installed in the ground;
   a condenser section connected to an intermediate section connected in series between said condenser and evaporator sections, said intermediate section connected to a said heat exchanger; wherein
   said evaporator section and said condenser section constitute a passive thermosyphon; and
   said heat exchanger is provided with incoming and outgoing mechanical refrigeration lines which comprise part of a mechanical refrigeration system said passive thermosyphon said heat exchanger and said mechanical refrigeration system comprise means to refrigerate the ground when the ground temperature is above ambient temperature and to refrigerate the ground supplementary to said passive thermosyphon when the ground temperature is below ambient temperature.

2. The apparatus of claim 1 wherein the condenser section includes a housing adapted to contain refrigerant circulated within said heat exchanger, and heat transfer enhancing surfaces adapted to contact the refrigerant contained within the housing.

3. The apparatus of claim 2 further comprising an inlet manifold disposed in the heat exchanger between the incoming mechanical refrigeration line and the housing for uniform circulation of said refrigerant through said heat exchanger.

4. The apparatus of claim 2 further comprising an outlet manifold disposed in the heat exchanger between the outgoing mechanical refrigeration line and the housing for uniform circulation of said refrigerant through said heat exchanger.

5. The apparatus of claim 3 further comprising an outlet manifold disposed in the heat exchanger between the outgoing mechanical refrigeration line and the housing for uniform circulation of said refrigerant through said heat exchanger.

* * * * *